US010565212B2

(12) United States Patent
Brady

(10) Patent No.: US 10,565,212 B2
(45) Date of Patent: Feb. 18, 2020

(54) SYSTEMS AND METHODS FOR PROVIDING NON-MANIPULABLE TRUSTED RECOMMENDATIONS

(71) Applicant: FACEBOOK, INC., Menlo Park, CA (US)

(72) Inventor: Aaron Brady, Menlo Park, CA (US)

(73) Assignee: Facebook, Inc., Menlo Park, CA (US)

(*) Notice: Subject to any disclaimer, the term of this patent is extended or adjusted under 35 U.S.C. 154(b) by 784 days.

(21) Appl. No.: 14/292,548

(22) Filed: May 30, 2014

(65) Prior Publication Data

US 2015/0347413 A1    Dec. 3, 2015

(51) Int. Cl.
*G06F 16/2457* (2019.01)
*G06F 16/951* (2019.01)
*G06F 16/335* (2019.01)

(52) U.S. Cl.
CPC ...... *G06F 16/24578* (2019.01); *G06F 16/335* (2019.01); *G06F 16/951* (2019.01)

(58) Field of Classification Search
CPC ........... G06F 17/3053; G06F 17/30864; G06F 17/30699; G06F 16/24578; G06F 16/951
USPC ....................................................... 707/751
See application file for complete search history.

(56) References Cited

U.S. PATENT DOCUMENTS

| 6,665,655 | B1* | 12/2003 | Warner | G06F 16/30 |
| 8,001,003 | B1* | 8/2011 | Robinson | G06Q 30/0201 |
| | | | | 705/14.53 |
| 9,009,082 | B1* | 4/2015 | Marshall | G06Q 30/0601 |
| | | | | 705/26.1 |
| 9,092,510 | B1* | 7/2015 | Stets, Jr. | G06F 17/30648 |
| 9,607,325 | B1* | 3/2017 | Sriram | G06Q 30/0282 |
| 2006/0121434 | A1* | 6/2006 | Azar | G06Q 30/0203 |
| | | | | 434/350 |
| 2008/0077574 | A1* | 3/2008 | Gross | G06F 17/30699 |
| 2008/0091510 | A1* | 4/2008 | Crandall | G06Q 30/02 |
| | | | | 705/7.32 |
| 2011/0093523 | A1* | 4/2011 | Jaye | G06Q 30/02 |
| | | | | 709/203 |

(Continued)

OTHER PUBLICATIONS

Rashid et al. "Getting to Know You: Learning New User Preferencences in Recommender Systems." IUI'02, Jan. 13-16, 2002, San Francisco, CA. Copyright 2002 ACM. 8 pages.*

(Continued)

*Primary Examiner* — Kimberly L Wilson
(74) *Attorney, Agent, or Firm* — Keller Jolley Preece

(57) ABSTRACT

Exemplary methods, apparatuses, systems, and user interfaces for providing non-manipulable trusted recommendations are described. An embodiment includes determining that users have interacted with entities and causing entity rating user interface modules to be presented to a random subset of the users to allow those users to provide ratings for the entities. The ratings are received, and quality score values are determined for the entities based upon the received ratings and timestamps indicating when each respective user last interacted with the respective entity. A recommendation user interface module is presented to a user, which includes a set of entity modules corresponding to a set of the entities having the largest or smallest quality score values of the determined quality score values.

24 Claims, 8 Drawing Sheets

(56) References Cited

U.S. PATENT DOCUMENTS

| | | | | |
|---|---|---|---|---|
| 2013/0204825 A1* | 8/2013 | Su | ............................ | G06N 5/04 |
| | | | | 706/46 |
| 2014/0164511 A1* | 6/2014 | Williams | .............. | H04L 67/306 |
| | | | | 709/204 |
| 2014/0258027 A1* | 9/2014 | Veugen | .............. | G06Q 30/0278 |
| | | | | 705/26.7 |
| 2015/0339687 A1* | 11/2015 | Ioannidis | ........... | G06Q 30/0241 |
| | | | | 705/7.33 |
| 2016/0012511 A1* | 1/2016 | Braziunas | .......... | G06Q 30/0631 |
| | | | | 705/14.53 |

OTHER PUBLICATIONS

Darwell, Brittany. "Facebook tries star ratings, home page requests to push users toward games." Adweek. Apr. 2, 2012. 4 pages. https://www.adweek.com/digital/facebook-tries-star-ratings-home-page-requests-to-push-users-toward-games/.*

\* cited by examiner

Figure 6

$$QS1 = \log_b(n) \times \underbrace{\frac{1}{n} \times \sum_{i=1}^{n} x_i}_{\text{MEAN OF RATINGS 630}}$$
(SIZE ADJ. VALUE 635)

← SIZE-ADJUSTED QUALITY SCORE VALUE 600

$$QS1A = \underbrace{\log b(n)}_{\text{SIZE ADJ. VALUE 635}} \times \underbrace{\frac{1}{n} \times \sum_{i=i}^{n} (x_i^2)}_{\text{MEAN OF SQUARED RATINGS 631}}$$

← SPREAD RATING SIZE-ADJUSTED QUALITY SCORE VALUE 605

$$QS2 = \underbrace{\log_b(n)}_{\text{SIZE ADJ. VALUE 635}} \times \underbrace{\frac{1}{k+1} \times (\underbrace{\frac{1}{n}\sum_{i=1}^{n} x_i}_{\text{MEAN OF RATINGS 630}} + \sum_{j=1}^{k} y_j)}_{\text{MEAN OF SUM OF RATINGS MEAN AND ALL THIRD PARTY RATINGS 633}}$$

← THIRD-PARTY INFLUENCED SIZE-ADJUSTED QUALITY SCORE VALUE 610

$$QS3 = \underbrace{\log_b(n)}_{\text{SIZE ADJ. VALUE 635}} \times \underbrace{\frac{1}{n}\sum_{i=1}^{n} \frac{x_i}{AGE_i}}_{\text{MEAN OF AGE-ADJUSTED RATINGS 632}}$$

← FRESHNESS-BIASED SIZE-ADJUSTED QUALITY SCORE VALUE 615

SYSTEMS AND METHODS FOR PROVIDING NON-MANIPULABLE TRUSTED RECOMMENDATIONS

FIELD

The various embodiments described herein relate to recommendation systems. In particular, the embodiments relate to systems and methods for providing non-manipulable trusted recommendations.

BACKGROUND

Humans are inquisitive and social creatures. Accordingly, many computer applications have been developed with social features allowing users the ability to interact just as humans might in a face-to-face setting, such as allowing people to make recommendations to one another. For example, some websites have been developed with a primary focus upon user recommendations (e.g., restaurant review sites, video game reviews, business reviews) and others have a different focus but similarly allow for user recommendations (e.g., online storefronts allowing reviews of items for sale, social networking systems). Such recommendations are often in the form of a numeric rating and/or a textual description (i.e., "review") of a particular thing or "entity."

However, many of these applications suffer because the quality of the reviews is highly questionable, leading the usefulness of the reviews to be significantly degraded. For example, some reviewers posting reviews may not have actually interacted with the entity being reviewed. Additionally, some reviewers may be biased and thus have a strong positive or negative predispositions (e.g., an affinity for a particular brand of cola) that affect the objectivity of their reviews. Further, some reviews may be fraudulent, such as where a user is paid or encouraged to submit a positive or negative review. Reviews may also be poor when they are out-of-date and relate to an entity different than how it currently exists, such as a review for an early, buggy release of software that has subsequently been fixed or a restaurant on its opening night. Moreover, many reviews come from users having atypically positive or negative experiences with an entity, and thus the results will be highly skewed, as users with middle-of-the-road opinions may not be motivated to share their thoughts.

SUMMARY OF THE DESCRIPTION

Exemplary methods, apparatuses, systems, and user interfaces for providing non-manipulable trusted recommendations.

In one embodiment, users of an enterprise system are presented with an entity rating user interface module—which allows the users to providing a rating for an entity—only after the enterprise system receives one or more interaction signal messages indicating that the users have actually interacted with the entity. Those users that are selected to rate an entity through an entity rating user interface module are selected randomly to prevent selection bias. The entity rating user interface modules do not include indications of other ratings made by other users, which reduces bandwagon bias. Received ratings for an entity are transformed into a quality score value useful in providing recommendations. The transformation is effected by averaging the ratings and adjusting the averaged rating to both provide additional weight for entities having more reviews (e.g., established entities) but not to provide so much weight that entities with fewer reviews could never surface toward the top of a set of recommendations. In some embodiments, the ratings are discounted based upon when the rating was made, such that older ratings will have a lesser influence. One or more of those entities having the highest quality score values are presented to users as non-manipulable trusted recommendations.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which:

FIG. 6 illustrates exemplary formulas for use in constructing quality score values according to various embodiments;

DETAILED DESCRIPTION

Figure 1:
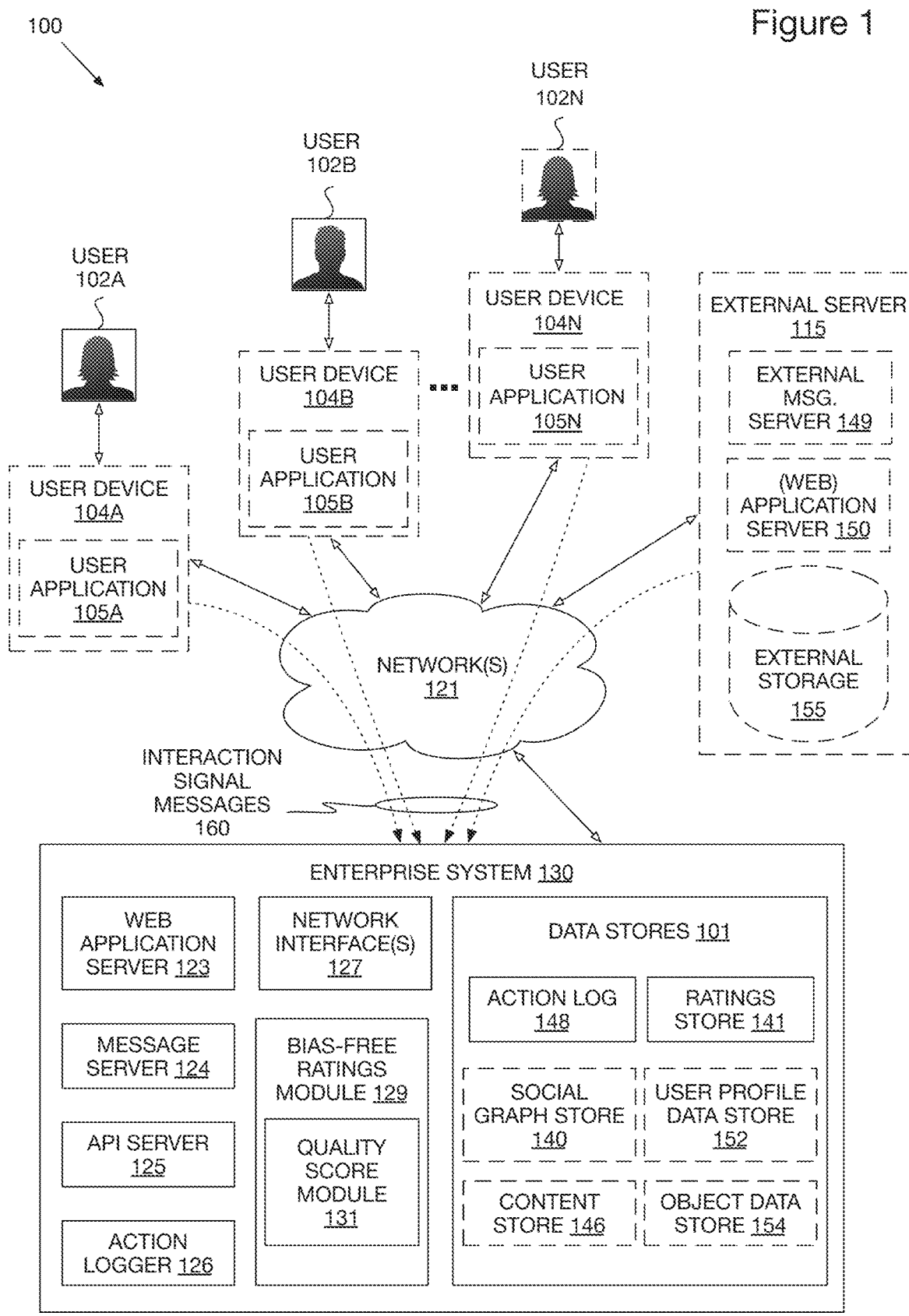
FIG. 1 illustrates an example network environment of a system including an enterprise system.

As described above, computer applications (e.g., web applications) enabling user reviews and recommendations suffer from a variety of biases that result in the collected reviews and resulting recommendations made based upon those reviews being poor and/or untrustworthy. As a first flaw, these applications typically suffer from selection or sampling bias, wherein systematic error is introduced into the set of ratings because those users that submit reviews are not representative of the overall population of users of the application. Many of these applications also suffer from a confirmation bias or bandwagon effect, wherein users will often give an entity a similar rating as those ratings already submitted by other users for the entity. Moreover, these applications also typically suffer from heterogeneous entity reviews, as many "old" reviews for an entity in a first state may significantly overshadow a "small" number of recent reviews of the entity in its current state.

Accordingly, there is a need for techniques to enable high quality, low-bias review and recommendation systems in computer applications. Detailed below are methods, apparatuses, user interfaces (UIs), and other systems for providing non-manipulable trusted recommendations. In some embodiments, users are presented with an entity rating user interface module—which allows the users to providing a rating for an entity—only after a system receives one or more signals indicating that the users have actually interacted with the entity to prevent fraudulent review bias. In some embodiments, those users that are selected to rate an entity through an entity rating user interface module are selected randomly to prevent selection bias. In some embodiments, the entity rating user interface modules do not include indications of other (or previous) ratings of other users, which can assist in reducing bandwagon bias. In some embodiments, received ratings for an entity are transformed into a quality score value useful in providing recommendations. In an embodiment, the transformation is effected by averaging the ratings and adjusting the averaged rating to both provide additional weight for entities having more reviews (e.g., established entities) but not provide so much weight that entities with fewer reviews could never surface toward the top of a set of recommendations. In some embodiments, when calculating quality score values, the ratings are discounted based upon when the rating was made, such that older ratings will have a lesser influence, to reduce the bias from heterogeneous entity reviews. In some embodiments, ratings will be associated with a timestamp of a last interaction between the user and the entity, such that entities being continually interacted with are given additional benefit.

In the following description, numerous specific details are set forth. However, it is understood that embodiments of the invention may be practiced without these specific details. Additionally, while embodiments of the invention are described with respect to an enterprise system, it is to be understood that these concepts are generally applicable to other systems, such a social networking system.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, bracketed text and blocks with dashed borders (e.g., large dashes, small dashes, dot-dash, and dots) are used herein to illustrate optional operations or components that add additional features to embodiments of the invention. However, such notation should not be taken to mean that these are the only operations or components, and/or that blocks with solid borders are not optional in certain embodiments of the invention. Additionally, the terms "rating" and "review" may be used herein interchangeably to refer to data from a user about an entity. However, the term "rating" generally refers to a value (e.g., numeric value, number of stars, letter grade) for an entity and the term "review" generally refers to a textual description of the entity and/or the user's opinion/experience with the entity.

FIG. 1 illustrates an example network environment of a system 100 that offers its users 102A-102N the ability to communicate and interact with other users 102A-102N and entities of the enterprise system 130 according to an embodiment of the invention. In some embodiments of the invention, the enterprise system 130 is a social networking system, and in some embodiments the enterprise system 130 is a web application including rating and/or recommendation functionalities. The illustrated enterprise system 130 includes a bias-free ratings module 129 for providing high quality, low-bias recommendations in accordance with an embodiment of the invention.

In some embodiments, the enterprise system 130 comprises one or more computing devices storing user profiles 152 associated with users 102A-102N and/or other objects 154, as well as connections between the users 102A-102N and/or objects.

The user devices 104A-104N that interact with enterprise system 130 can be any type of computing device capable of receiving user input as well as transmitting and/or receiving data via a network (e.g., network 121). For example, the user devices 104A-104N can include conventional computer systems, such desktop or laptop computers, or may include devices having computer functionalities such as Personal Digital Assistants (PDA), cellular or mobile telephones, smart-phones, in- or out-of-car navigation systems, gaming devices, or other electronic devices.

In one embodiment, a user device (e.g. 104A) executes a user application (e.g. 105A) allowing a user 102A of the user device 104A to interact with the enterprise system 130. For example, the user application 105A may be a web browser application (e.g., Microsoft Windows Internet Explorer, Mozilla Firefox, Apple Safari, Google Chrome, Opera, etc.). In an embodiment, the user application 105A is a special-purpose client application (e.g., Facebook for iPhone or iPad, etc.), and in an embodiment the user application 105A is the native operating system of the user device 104A, such as Windows®, Mac OSX®, IOS®, or ANDROID™ which may utilize an Application Programming Interface (API) to directly interface with the enterprise system 130 by transmitting and receiving API request and API response messages with API server 125.

The user devices 104A-104N are configured to communicate with the enterprise system 130 via a network 121 or collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols. Thus, the network 121 may include links using technologies such as Ethernet, Institute of Electrical and Electronics Engineers (IEEE) 802.11, Worldwide Interoperability for Microwave Access (WiMAX), 3G, 4G, Long Term Evolution (LTE), Code-Division Multiple Access (CDMA), Digital Subscriber Line (DSL), cable modems, etc. Similarly, the networking protocols used on the network 121 may include Multiprotocol Label Switching (MPLS), Transmission Control Protocol (TCP), Internet Protocol (IP), TCP/IP, User Datagram Protocol (UDP), Hypertext Transport Protocol (HTTP), Simple Mail Transfer Protocol (SMTP), File Transfer Protocol (FTP), or any of countless other protocols. Data exchanged over the network 121 may be represented using technologies and/or formats including Hypertext Markup Language (HTML), Extensible Markup Language (XML), or JavaScript Object Notation (JSON), among other formats. In addition, all or some of links can be encrypted using conventional encryption technologies such as Secure Sockets Layer (SSL), Transport Layer Security (TLS), or Internet Protocol security (IPsec).

The enterprise system 130 fundamentally relies upon information representing its users 102A-102N and a set of objects. Users 102A-102N may add connections to other users or objects of the enterprise system 130 to which they desire to be connected, and may also interact with these other users or objects. The users of the enterprise system 130 are individuals (e.g. humans), and the objects may include entities (such as businesses, organizations, universities, manufacturers, brands, celebrities, etc.), concepts, or other non-human things including but not limited to a location, an album, an article, a book, a concept, etc.

In some embodiments, the enterprise system 130 also allows users to interact with external (e.g., third-party) applications (e.g., websites) provided by an application server (e.g., web application server) 150, external messaging servers 149, external storage 155, and/or external servers 115 (e.g., server end stations).

The depicted embodiment of the enterprise system 130 includes an API server 125, a message server 124, an action logger 126, and a set of data stores 101. This depicted embodiment also includes, within the data stores 101, a social graph store 140 including a node store and an edge store, as well as a content store 146, an action log 148, a user profile data store 152, and an object data store 154. In other embodiments, the enterprise system 130 may include additional, fewer, or different modules for various applications. Conventional components such as processors, memories, security mechanisms, load balancers, failover servers, management and network operations consoles, and the like are not shown in FIG. 1 so as to not obscure the details of the system. The web server 123 links the enterprise system 130 via the network 121 to one or more user devices 104A-104N by accepting requests for from the user devices 104A-104N and/or transmitting web pages or other web-related content to the user devices 104A-104N, such as image files, audio files, video files, Java applets, Flash, XML, JavaScript, Cascading Style Sheets (CSS), and so forth. The web server 123 in some embodiments is configured to utilize a set of one or more network interfaces 127 to send and receive messages across the network 121. In some embodiments the web server 123 (additionally or alternately) utilizes a message server 124 (e.g., a dedicated server end station, a dedicated software application, etc.) to communicate with the user devices 104A-104N, which is operative to send and/or receive instant messages, queued messages (e.g., email), text and SMS (Short Message Service) messages, or utilize any other suitable messaging technique.

In some embodiments, such as when the enterprise system 130 is (or includes) a social networking system, the enterprise system 130 generates and maintains a "social graph" in a social graph store 140 comprising a plurality of nodes interconnected by a plurality of edges that represent the stored data about users 102A-102N and/or objects. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the enterprise system 130 adds, removes, or otherwise modifies edges connecting the various nodes to reflect the interactions.

The enterprise system 130 allows its users 102A-102N to communicate or otherwise interact with each other and access content, as described herein. The enterprise system 130 stores user profiles in the user profile data store 152. A user profile includes declarative information about the user that was explicitly shared by the user, and may also include profile information inferred by the enterprise system 130. In one embodiment, a user profile includes multiple data fields, each data field describing one or more attributes of the corresponding user of the enterprise system 130. The user profile information stored in user profile data store 152 describes the users 102A-102N of the enterprise system 130, including biographic, demographic, and other types of descriptive information, such as work experience, educational history, gender, relationship status, hobbies, location, other preferences, and the like. The user profile may also store information provided by the user. For example, images or videos provided by the user may also be stored within the user profile. In other embodiments only textual data of the user is stored in the user profile and other data (e.g., images, videos) are stored in multimedia stores and associated with the user (e.g., through associating a user identifier of the user with an image/video identifier of the multimedia content). In certain embodiments, images or videos including or depicting users of the enterprise system 130 may be "tagged" with identification information of those users. A user profile in the user profile data store 152 may also maintain references to actions (stored in the user profile or in an action log 148) by the corresponding user performed on content items in a content store 146 and stored in an edge store 144. A user may also specify one or more privacy settings, which are stored in that user's user profile. Privacy settings limit information that the enterprise system 130 or other users of the enterprise system 130 are permitted to access from that user's user profile.

In some embodiments, a message sent by a user to another user by way of the enterprise system 130 can be viewed by other users of the enterprise system 130, for example, by certain connections of the user (directly connected users in the social graph, other users more than one hop away in the social graph, etc.) receiving the message. An example of a type of message that can be viewed by other users of the enterprise system 130 (besides the recipient of the message) is commonly known as a wall post. In some embodiments, a user can send a private message to another user that can only be retrieved by the other user.

When a user takes an action within the enterprise system 130, the action may be recorded in an action log 148 by an action logger 126, subject to any privacy settings and restrictions of the user and/or enterprise system 130. In one embodiment, the enterprise system 130 maintains the action log 148 as a database of entries. When an action is taken on the enterprise system 130, the enterprise system 130 can add an entry for that action to the action log 148. In accordance with various embodiments, the action logger 126 is capable of receiving communications from the web server 123 about user actions on and/or off the enterprise system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the enterprise system 130 that may be stored in the action log 148 include, but are not limited to, adding a connection to another other user, sending a message to the other user, reading a message from the other user, viewing content (e.g., wall posts, images, videos) associated with or created by the other user, attending an event posted by another user, being tagged in photos with another user, etc. In some embodiments, certain actions are described in connection with more than one user, and these actions may be associated with those users as well and stored in the action log 148.

The action log 148 may be used by the enterprise system 130 to track other user actions on the enterprise system 130, as well as actions on an external application 150 (e.g., website) that are communicated to the enterprise system 130. Users may interact with various objects on the enterprise system 130, including commenting on posts, sharing links, and checking-in to physical locations via a mobile device, accessing content items in a sequence or other interactions. Information describing these actions is stored in the action log 148. Additional examples of interactions with objects on the enterprise system 130 included in the action log 148 include logging in to the enterprise system 130, commenting on a photo album, communications between users, becoming a fan of a musician or brand by "liking" a page of the respective entity, adding an event to a calendar, joining a group, creating an event, authorizing an application, using an application, and engaging in a transaction. Additionally, the action log 148 records a user's interactions with advertisements on the enterprise system 130 as well as other applications operating on the enterprise system 130. In some embodiments, data from the action log 148 is used to infer interests or preferences of the user, augmenting the interests included in the user profile and allowing a more complete understanding of user preferences.

The API server 125 allows external systems (e.g., an external application 150 of external server 115, and/or user applications 105A of user devices 104A-104N) to access information from or transmit information to the enterprise system 130 by issuing API calls. The information provided by the enterprise system 130 may include user profile information or the connection information of users, subject to the individual privacy settings of the user. For example, a system (e.g. external application 150) may send an API request to the enterprise system 130 via the network 121 to publish a story on behalf of a user, request information about a user (after having been given permission to do so by the user), upload a photograph on behalf of a user, etc. API requests are received at the enterprise system 130 by the API server 125, which then processes the request by performing actions sought by the API requests, determining appropriate responses to the API requests, and transmitting back these responses back to the requesting application 150 via the network 121.

The content store 146 stores content items associated with user profiles, such as images, videos, and/or audio files. Content items from the content store 146 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users or entities, to invite new users to the system or to increase interaction with the social network system 130 by displaying content related to users, objects, activities, or functionalities of the enterprise system 130. Examples of social networking content items include suggested connections or suggestions to perform other actions, media provided to or maintained by the enterprise system 130 (e.g., pictures, videos), status messages or links posted by users to the social networking system, events, groups, pages (e.g., representing an organization or commercial entity), recommendations, and any other content provided by, or accessible via, the enterprise system 130.

The content store 146 also includes one or more pages associated with entities included social graph store 140. An entity is a type of object that can be a non-individual user of the enterprise system 130, such as a business, a vendor, an organization, or a university. However, in some embodiments of the invention, an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the enterprise system 130. For example, a page identifies content associated with the entity's stored content (from the object data store 154) as well as information describing how to present the content to users viewing the page.

In the depicted embodiment, the enterprise system 130 includes a bias-free rating module 129 for generating quality score values for entities based upon ratings, which can be used when constructing recommendation user interface modules to decide which entities should be recommended to users and in what order they should be ranked. This embodiment also includes ratings store 141, which stores ratings and/or reviews of the entities.

Figure 2:
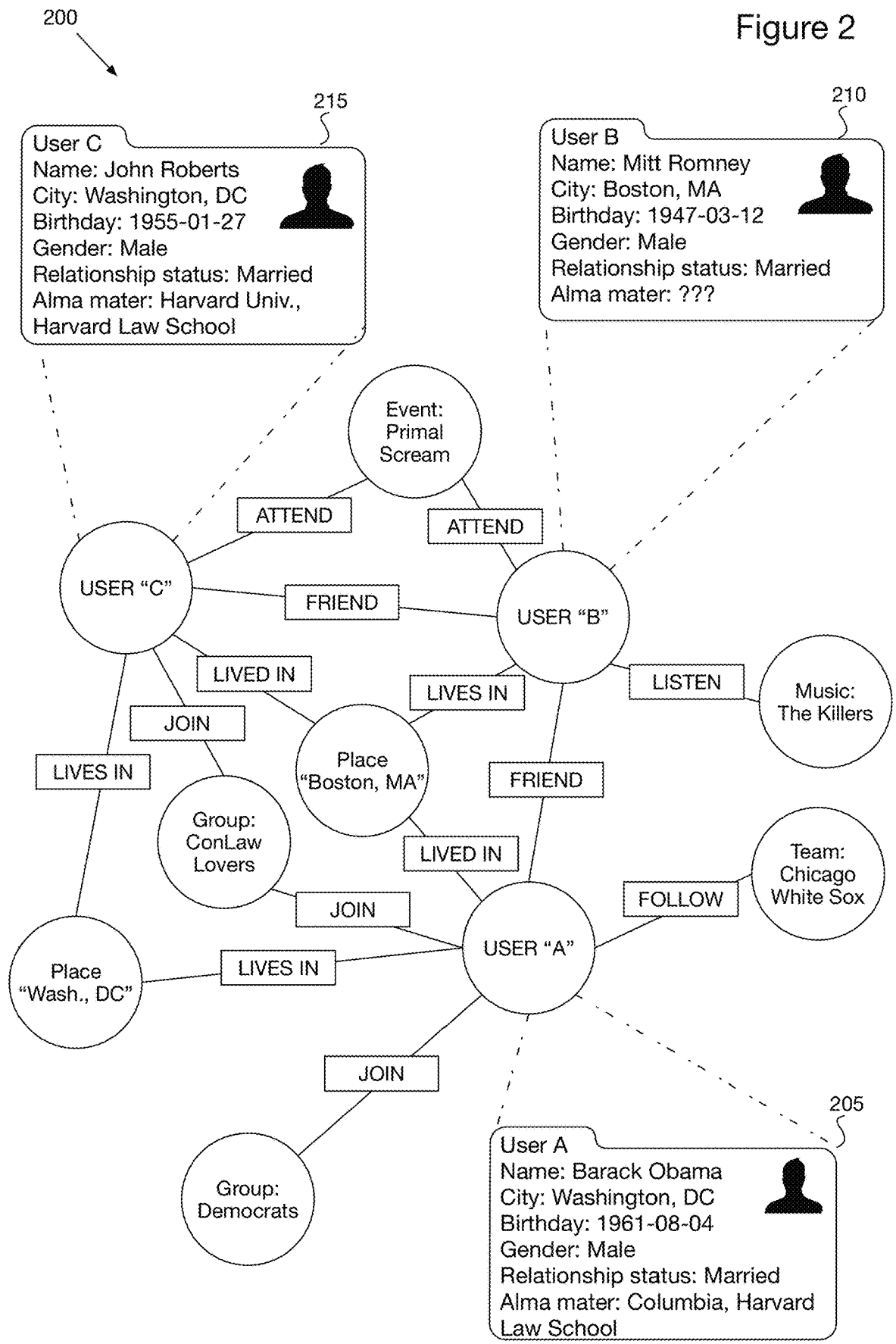
FIG. 2 illustrates exemplary graph of social network data.

FIG. 2 illustrates an exemplary graph 200 of social network data. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, is following the White Sox, and is friends with User B. User B and User C have also performed a number of actions with respect to objects within the graph 200.

In one embodiment, users are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, users are able to provide feedback on actions of other users/entities. As a result, actions are also viewed as objects that may be acted upon. For example, User B listened to music by the artist "The Killers." As a result, the social networking system publishes a narrative associated with User B (e.g., in a newsfeed, profile of User B, etc.) indicating that User B listened to music by the artist "The Killers." In viewing a newsfeed, profile of User B, or another form of social networking system publication, the social networking system displays the narrative to User A. The social networking system then receives input from User A indicating that User A "likes" that User B listened to "The Killers."

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity.

In one embodiment, users may select privacy settings to control what network service data is shared, with whom the data is shared, and/or what data used for selecting candidate objects.

Figure 3:
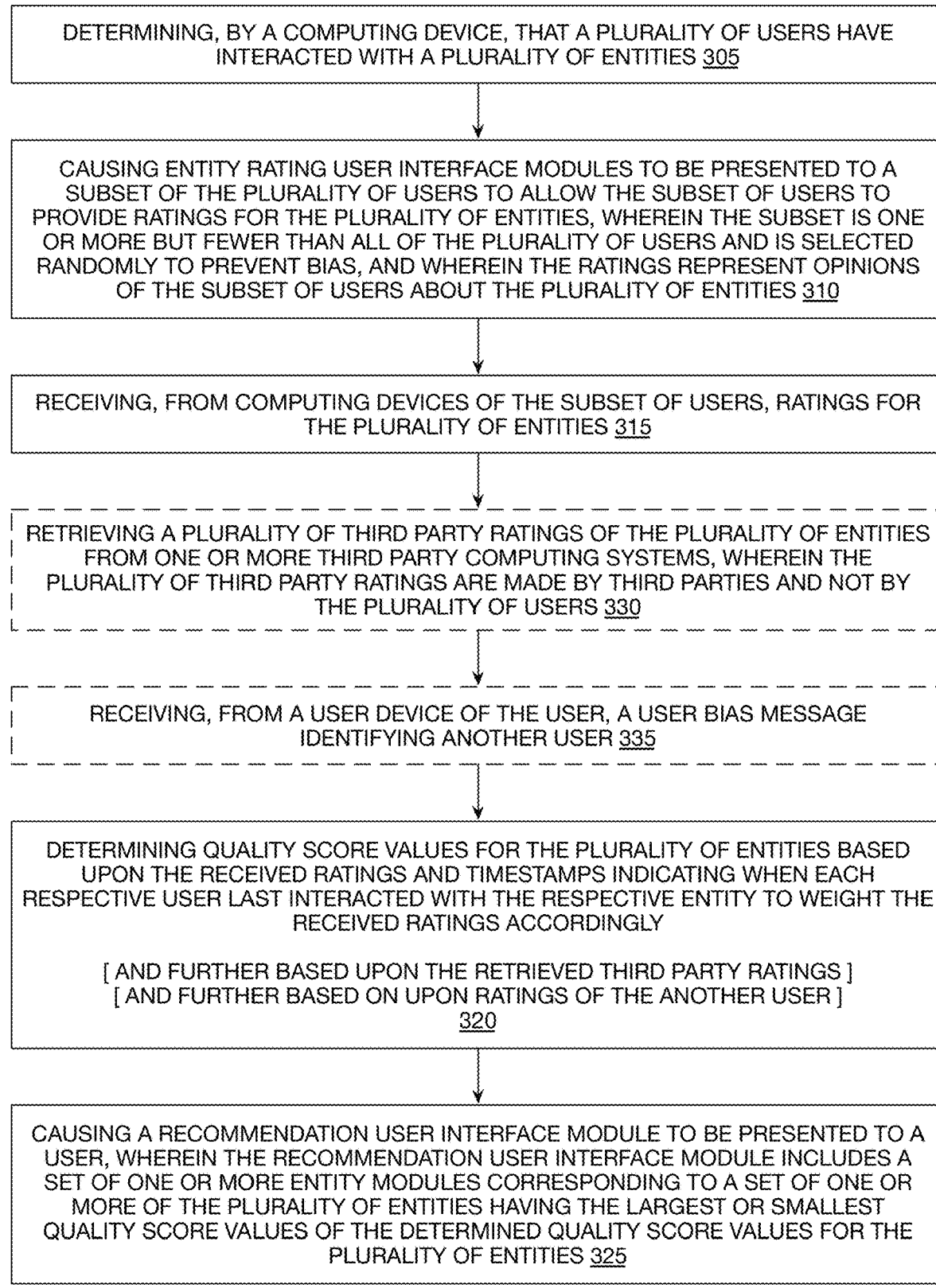
FIG. 3 illustrates a method for generating and presenting high-quality, low-bias recommendations according to an embodiment.

FIG. 3 illustrates a method 300 for generating and presenting high-quality, low-bias recommendations according to an embodiment of the invention. The method 300 includes at block 305 determining, by a computing device, that a plurality of users (e.g., users 102A-102N) have interacted with a plurality of entities. In an embodiment, the computing device is one or more computers of the enterprise system 130, and plurality of users are users of the enterprise system 130. In an embodiment, the determining 305 includes receiving one or more interaction signal messages 160 from user devices 104A-104N of the users 102A-102N and/or external (e.g., "third party") servers 115. For example, in an embodiment where entities are computer applications (e.g., games) executing at least in part on the user devices 104A-104N, the user devices 104A-104N may be configured to transmit interaction signal messages 160 to the enterprise system 130 to indicate that the respective user is interacting with that game (i.e., entity). In various embodiments, the interaction signals include one or more of an entity identifier of the entity, a user identifier of the user (e.g., a unique user ID, a name, a location, a signature, an email address), an interaction identifier, and a timestamp indicating a time when the user was/is interacting with the entity. The interaction signals may be transmitted at the beginning of an interaction with an entity (e.g., at the beginning of a game), at the conclusion of an interaction with an entity (e.g., at the end of a game), during an interaction with an entity (e.g., after the user has played the game for five minutes), at particular intervals of time while the user continues to interact with an entity (e.g., every five minutes), or in combinations of these configurations. Alternatively, interaction signal messages 160 may be sent as a batch at periodic intervals.

In some embodiments where the entity is a computer application, the computer application may be programmed to transmit the interaction signal messages 160 to the enterprise system 130, and in some embodiments where the computer application executes within a webpage (e.g., within an HTML frame or "iframe"), the webpage includes code (e.g., JavaScript code) configured to transmit the interaction signal messages 160 to the enterprise system 130. In other embodiments, the interaction signal messages 160 are transmitted by an external server 115. For example, in an embodiment where the entity is a computer application that executes at least in part on an external server 115, the external server 115 transmits one or more interaction signal messages 160 to enterprise system 130 using one or more of the configuration options described above. In some embodiments, the interaction signal messages 160 are transmitted by an external server 115 or the user devices 104A-104N for other types of entities. For example, the entity may be a good, asset, or service available for sale or provided by a website hosted by web application server 150 of an external server 115. In such embodiments, if the user interacts with that good, asset, or service (e.g., purchases it, rents it, views it, reads it, etc.) the external server 115 or the user device (e.g. 104A) may be configured to transmit one or more interaction signal messages 160 indicating that the interaction has occurred. In other embodiments, an external server 115 may be configured to automatically (or at a manual request of a user) transmit interaction signal messages 160 when users interact with other types of entities, including but not limited to when a user purchases a movie ticket, purchases an item at a physical store, purchases a service from a company, views a movie or video, visits a particular geographic (natural or man-made) location or building, attends an event (e.g., a concert, festival, fair, farmers market, sporting event), visits a store, or interacts in any other way with any other place or thing.

The method 300 also includes, at block 310, causing entity rating user interface modules 510 to be presented to a subset of the plurality of users to allow the subset of users to provide ratings for the plurality of entities. A rating (or review) represents an opinion of a user about an entity. In an embodiment, the subset of users is one or more but fewer than all of the plurality of users and is selected randomly to prevent bias. For example, the enterprise system 130 may select a particular percentage of the plurality of users to be in this subset, such as 5%, 10%, 15%, or any other percentage of users that is greater than zero and less than one-hundred. The particular percentage of users to be configured is up to an administrator of the system, and typically those systems having more users may benefit from smaller percentages, as smaller percentages typically result in less resulting selection bias.

In embodiments of the invention, each entity rating user interface module 510 includes one or more of an entity identifier 505 (e.g., a name of the entity and/or an icon, trademark, or photograph of the entity) and a rating user input element 515 allowing the user to provide a rating or review of an entity. In an embodiment, the rating user input element 515 includes two or more icons (e.g., stars or check-marks) allowing the user to select a number of the icons to represent a rating (e.g., select a fourth star of five depicted stars to represent a 4.0 out of 5.0 rating), although in other embodiments other well-known user input elements can be used including, but not limited to, drop-down lists, checkboxes, radio boxes, text input boxes, text areas, combo boxes, etc. In an embodiment, after a user provides a rating for the entity using a rating user input element 515, the user device transmits a rating message (automatically or at the request of the user) to the enterprise system 130 that includes an entity identifier and the user-provided rating value. The rating user interface modules 510 may prompt users for a general rating for the entity and/or for a specific attribute-specific rating for the entity. For example, in an embodiment where the entities are videogames, the rating user interface modules 510 may ask for an "overall rating" of a game as well as ratings for graphics, sound, difficulty, fun, etc.

Accordingly, the enterprise system 130 in an embodiment transmits a message including, e.g., HTML code or JSON data (or otherwise formatted data), to the user device that in turn receives the message and renders the entity rating user interface modules 510 for the user based upon the message.

In an embodiment, the entity rating user interface modules 510 are presented to the users as a portion (or all) of a web page or a portion (or all of) of an application on a display of a user device. For example, the entity rating user interface modules 510 could be displayed on a television screen, such as when the user device is a video game system or personal computer. For further example, the entity rating user interface modules 510 could be displayed on a computer monitor or display of a mobile or traditional computing device, or on a display screen of an automobile, airplane, or other transit vehicle.

The method 300 also includes at block 315, receiving, from computing devices of the subset of users, ratings for the plurality of entities. After presenting the entity rating user interface modules 510 to the users, the users may provide ratings or reviews for the respective entities, which are then transmitted back to the enterprise system 130 in rating submission messages. In an embodiment, the ratings are stored in ratings store 141. Each rating submission message may include one or more of an entity identifier, a rating or review, and/or a user identifier. In some embodiments, the rating submission message includes a rating or review and a rating identifier, which is known to the enterprise system 130 and mapped therein to an entity identifier and a user identifier of the user.

The method 300 optionally includes at block 330 retrieving a plurality of third party ratings of the plurality of entities from one or more third party computing systems. One or more of the third party computing systems implement, in an embodiment, the external server 115 depicted in FIG. 1. Each of the plurality of third party ratings is made by a third party and not by one of the plurality of users.

According to an embodiment, the third party computing systems may provide access to rating websites providing ratings/reviews of entities. In an embodiment, the enterprise system 130 is configured with a list of websites providing ratings for particular entity types. In an example involving entities that are video games, the enterprise system 130 is configured to request, from one or more of the list of websites, a rating for the entity—here, a video game. In some embodiments, the enterprise system 130 utilizes its API server 125 to issue API requests for the ratings with an external messaging server 149 of the third party computing system. In an embodiment, the bias-free ratings module 129 of the enterprise system 130 utilizes the network interfaces 127 to request a web page (of the list of websites) from a web application server 150 of a third party computing system, receives the webpage, and utilizes a rating-identifying algorithm (e.g., a set of operations including the use of a regular expression, a template, natural language processing) to find the rating within the received web page. These retrieved ratings, in an embodiment, are stored within the ratings store 141 for later use by the bias-free ratings module 129 when constructing recommendations.

In an embodiment, the retrieved ratings are normalized. For example, when the enterprise system 130 utilizes rating user input elements 515 allowing for a particular scale of ratings (e.g., integers between 0 and 5, inclusive), the retrieved ratings may utilize a different scale of ratings (e.g., integers between 1 and 10, inclusive; integers between 1 and 100, inclusive; a set of rational numbers between 0 and 5, inclusive; etc.) In these scenarios, the retrieved rating (e.g., 87 out of 100 with a scale of 0-100) is scaled to meet the scale of the enterprise system 130 (e.g., integers between 1 and 5). In an embodiment, the scaling includes dividing the retrieved rating by the maximum possible retrieved rating of the particular website (e.g., 87/100=0.87) and multiplying the result by the maximum possible enterprise system 130 rating (e.g., 0.87×5=4.35), and optionally rounding the result to a nearest scaled system value (e.g., round 4.5 to just 4).

In addition to retrieving third party ratings, the method 300 also optionally includes at block 335 receiving, from a user device of the user, a user bias message identifying another user. In an embodiment, users are presented influence user interface modules 550 that allow the user to specifically "influence" the set of recommended entities by the ratings of other particular users as selected by the users. In some embodiments, the "other" users include other human users of the enterprise system 130, objects represented within the enterprise system 130 such as entities (businesses, organizations, universities, manufacturers, brands, celebrities, etc.), or even entities or individuals with no representation within the enterprise system 130. As detailed later herein with respect to FIG. 5 and FIG. 6, there are many ways to influence a set of recommended entities according to other users.

Turning back to the method 300 of FIG. 3, the method 300 also includes at block 320 determining quality score values for the plurality of entities based upon the received ratings and timestamps indicating when each respective user last interacted with the respective entity to weight the received ratings accordingly. For example, in an embodiment the quality score values are based upon an average rating score comprising an average value of each of the ratings that have been modified based upon the timestamp of when the user last interacted with the entity. In an embodiment, a modified rating for a rating with a newer (i.e., more recent) timestamp will be larger than modified rating for the same rating with an older (i.e., less recent) timestamp. For example, in an embodiment each rating value is divided by an age of the associated timestamp, where the age is a number of minutes, hours, days, weeks, months, or years that the respective timestamp predates a current timestamp value.

In some embodiments, however, the quality score values are not based upon timestamps. For example, in an embodiment the quality score value is based upon an average rating score calculated for each entity based upon calculating an arithmetic mean 630 (i.e., average) for all ratings provided by the users of the enterprise system 130, or, in some embodiments, based upon calculating an arithmetic mean of the squares 631 of each rating value. In some embodiments, the average rating score is further adjusted based upon a size adjustment value 635 that accounts for the number of ratings for that entity. In an embodiment, the size adjustment value 635 is based upon a result of an application of a logarithmic function to the number of ratings for that entity. Several exemplary algorithms for determining quality score values will be discussed in further detail with respect to FIG. 6.

In embodiments where block 330 (i.e., retrieving a plurality of third party ratings . . . ) is performed, the determining of the quality score values in block 320 may further be based upon the retrieved third party ratings. In an embodiment, the determining of a quality score value for an entity is based upon determining a first arithmetic mean 630 of all enterprise system 130 user ratings for the entity, and determining a second arithmetic mean of a set of values including the first arithmetic mean and each of the third party ratings for the entity. In some embodiments, the quality score value is further based upon adjusting the second arithmetic mean based upon a result of an application of a logarithmic function to the number of ratings for that entity. Also, in some embodiments the determining of the first arithmetic mean includes utilizing timestamps as described above to modify each individual enterprise system 130 user rating before determining the mean of those ratings. Of course, other embodiments of the invention may utilize the third party ratings in the quality score value determination in different ways easily determined by those of skill in the art without departing from the spirit of these embodiments of the invention.

In embodiments where block 335 (i.e., receiving a user bias message identifying another user . . . ) is performed, the determining of the quality score values in block 320 may further be based upon ratings of the another user. In some embodiments, an additional rating of the respective entity made by the another user are included within the quality score value determination to result in the quality score value being more weighted by the additional rating. For example, while in an embodiment the additional rating of the another user is already factored as one data point in an initial arithmetic mean 630 calculation, that resulting average is weighted by the additional rating by calculating another arithmetic mean 633 of the initial arithmetic mean with the additional rating. In embodiments where multiple additional users are identified in one or more user bias messages at block 335, each rating of the entity by each of the multiple additional users is used to adjust the quality score value computation process. For example, in an embodiment an initial arithmetic mean 630 of all enterprise system 130 user ratings is calculated, and then used as one data point in a second arithmetic mean calculation 633 of the initial arithmetic mean and each respective additional review from the additional users. Of course, the additional (one or more) ratings of the another user(s) may be utilized in the quality score value determination in different ways easily determined by those of skill in the art without departing from the spirit of these embodiments of the invention.

The method 300 also includes, at block 325, causing a recommendation user interface module to be presented to a user that includes a set of one or more entity modules corresponding to a set of one or more of the plurality of entities having the largest or smallest quality score values of the determined quality score values for the plurality of entities. In some embodiments, block 325 includes transmitting a message to the user device (e.g., 104A) of the user (e.g., 102A) that is processed by the user device 104A and causes the user device 104A to render the recommendation user interface module on a display. In some embodiments, the message is an HTTP response message including HTML content. In an embodiment, the HTML content includes one or more entity modules 702 that recommend respective entities to the user.

After determining the quality score values for each of the plurality of entities, the bias-free ratings module 129 determines which of the plurality of entities should be recommended to the user 102A. In an embodiment where the quality score module 131 is configured to generate larger quality score values for those entities having higher quality, the bias-free ratings module 129 selects the one or more entities to be recommended that have the highest quality score values; similarly, in an embodiment where the quality score module 131 is configured to generate smaller quality score values for those entities having higher quality, the bias-free ratings module 129 selects the one or more entities to be recommended that have the smallest quality score values.

In an embodiment, either the web application server 123 utilizes the one or more entities selected by the bias-free ratings module 129 to construct HTML content that is transmitted in an HTTP response message. In various embodiments, the message server 124 and/or the API server 125 utilizes the one or more entities selected by the bias-free ratings module 129 to construct messages to be transmitted to a user device 104A of the user 102A. In some embodiments, each message includes JSON data, JavaScript code, HTML content, XML data, Standard Generalized Markup Language (SGML) data, and/or other types of information. After receipt of a message, the user device 104A renders the recommendation user interface module, which may occur through user application 105A.

Figure 4:
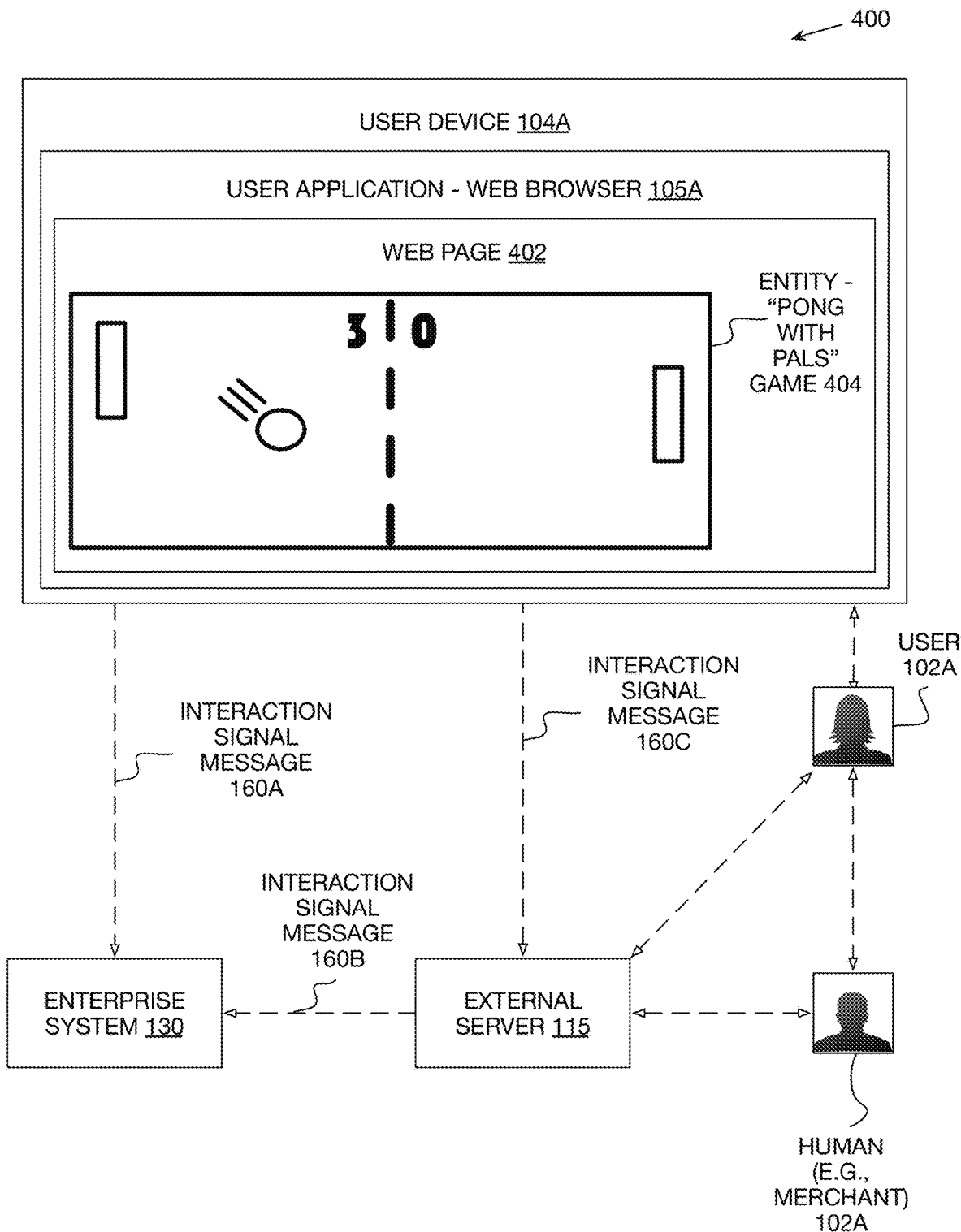
FIG. 4 illustrates a block diagram of an exemplary system utilizing interaction signal messages for detecting user-entity interaction according to an embodiment.

FIG. 4 illustrates a block diagram of an exemplary system 400 utilizing interaction signal messages 160 for detecting user-entity interaction according to an embodiment. In this depicted embodiment, the user device 104A executes a user application 105A that is a web browser, though in other embodiments the user application 105A may be other types of software including but not limited to an application specifically designed to access the enterprise system 130, an application specifically designed to access a third party system (e.g., external server 115), a game, a multimedia viewer, etc. In some embodiments, the entity 404 is the user application 105A itself, such as when the entity 404 is a game for a video game system.

In the depicted embodiment, the user application 105A is illustrated with a rendered web page 402 that is displayed to user 102A. The web page 402 includes an entity 404 that is a game entitled "Pong With Pals." In an embodiment, the entity 404 is configured to, through a set of network interfaces of the user device 104A, transmit interaction signal messages 160 to indicate that the user 102A is interacting with the entity 404. This transmission may occur one or more times as the user 102A interacts with (i.e., plays) the game—for example, it may occur as the game is loaded at the user device 104A, at the beginning of the user's 102A use of the game, at the end of the user's 102A use of the game, and/or one or more times during the user's 102A use of the game. In an embodiment, the game itself is configured to cause the transmission of interaction signal messages 160A, but in another embodiment code within the web page (e.g., JavaScript) that is not part of the game itself causes the transmission of interaction signal messages 160A.

In an embodiment, the execution of the entity 404 causes interaction signal messages 160A to be transmitted to the enterprise system 130, where it is received at a set of network interfaces 127, and optionally stored in a data store 101. In an embodiment, the execution of the entity 404 causes interaction signal messages 160C to be transmitted to an external server 115, which in turn will transmit an interaction signal message 160B to the enterprise system 130. In some embodiments, the external server 115 transmits an interaction signal message 160B responsive to its receipt of a respective interaction signal message 160C, but in some embodiments the external server 115 transmits them in batch or transmits two or more interaction signal messages 160C collectively within one interaction signal message 160B.

In some embodiments, the user 102A may directly utilize or cause the external server 115 to transmit the interaction signal message 160B to the enterprise system 130 without use of a user device 104A. For example, a user 102A may provide his/her identity (e.g., user identifier of enterprise system 130 and/or the user's name, address, etc.) to an external server 115 (or set of external servers) before, during, or after an interaction with an entity to thereby cause the interaction signal message 160B to be transmitted to the enterprise system 130. By way of example, in an embodiment where the entity is a movie, a user may provide identifying information upon purchasing a ticket for the movie at a movie theater (or entering or exiting the theater, etc.) to cause an external server 115 to transmit an interaction signal message 160B indicating that the user was interacting with the movie. In some embodiments, though, the user 102A interacts with another human 102A that in turn interacts with an external server 115 to cause the transmission of an interaction signal message 160B to the enterprise system 130. In an embodiment, the human 102A is a merchant that interacts with an external server 115 comprising a handheld device or other computer system. For example, the human 102A may be a ticket-taker or representative of a venue at a performance (i.e., an entity), and upon admitting the user 102A into the venue, causes the external server 115 to transmit an interaction signal message 160B indicating that the user 102A is about to view (i.e., interact with) the performance (i.e., the entity). Of course, many other configurations are available in other embodiments of the invention, provided that an interaction signal message 160 arrives at the enterprise system 130 to indicate an interaction between a user and an entity.

Figure 5:
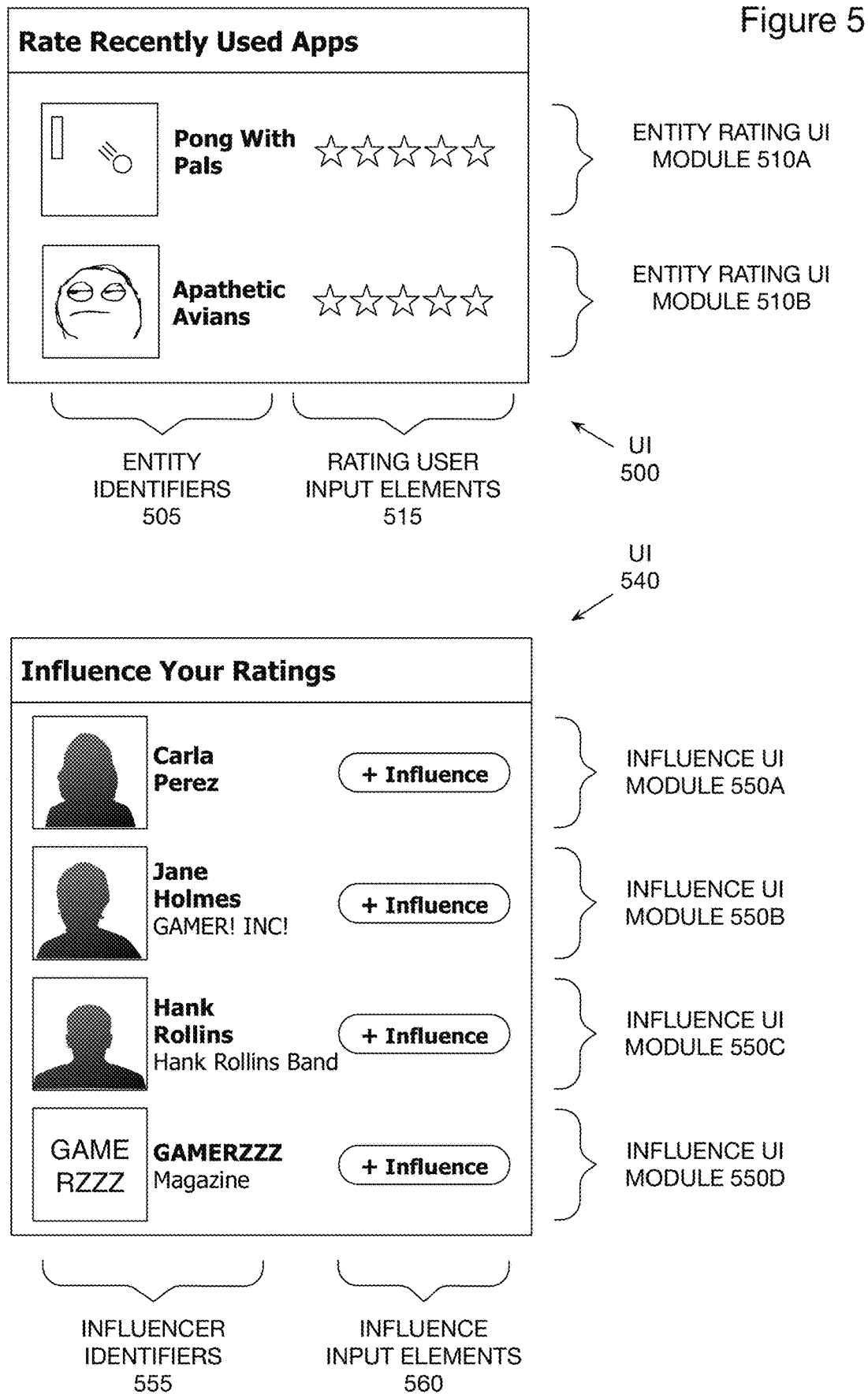
FIG. 5 illustrates exemplary user interfaces including entity rating user interface modules and influence user interface modules according to an embodiment.

FIG. 5 illustrates exemplary user interfaces 500, 540 including entity rating user interface modules 510 and influence user interface modules 550 according to an embodiment. A first UI 500 with a title "Rate Recently Used Apps" identifies one or more entities that, based upon received interaction signal messages 160 depicted in FIG. 4, the user is known to have interacted with. In the depicted embodiment, the first user interface 500 includes two entity rating UI modules 510A-510B for entities that are computer games—one rating UI module 510A for a game entitled "Pong With Pals" and a second rating UI module 510B for a game entitled "Apathetic Avians." In an embodiment, each of the entity rating UI modules 510A-510B includes one or more entity identifiers 505. In FIG. 5, each of the entity rating UI modules 510A-510B includes an icon and the title of the respective game. In some embodiments, one or more of the one or more entity identifiers 505 may be selected by the user (e.g., clicked on, touched, etc.) to allow the user to view more details about the entity or the user's previous interactions with the entity. In embodiments, each of the entity rating UI modules 510A-510B also includes at least one rating user input element 515 allowing the user to provide a rating/review of the respective entity. In the depicted embodiment of FIG. 5, each of the rating user input elements 515 includes a set of stars that may be selected to indicate a "star rating" (e.g., 0 to 5 stars) to represent the user's review. Of course, in other embodiments different well-known user input elements may be utilized to collect a rating or review from the users. In an embodiment, after a user provides a rating for the entity using a rating user input element 515, the user device transmits a rating message to the enterprise system 130 that includes an entity identifier (e.g., a unique entity ID value, the entity name, etc.) and the user-provided rating value. As described earlier, not every user determined to have interacted with an entity will be presented an entity rating UI module 510 for that entity; instead, only a subset of those determined users is selected to prevent selection bias from affecting user ratings of the entity.

A second UI 540 illustrated in FIG. 5 includes a title "Influence Your Ratings" and allows a user to select one or more other users as "influencers." In some embodiments, the "other" users include other human users of the enterprise system 130, objects represented within the enterprise system 130 such as entities (businesses, organizations, universities, manufacturers, brands, celebrities, etc.), or even entities or individuals with no representation within the enterprise system 130. In some embodiments of the invention, when one or more other users are selected to be influencers by a user, the determination of quality score values may be adjusted based upon the ratings of those other users such that their opinions (i.e., ratings) will bias the quality score values more strongly than the ratings of any other user being considered.

In the depicted embodiment of FIG. 5, the second UI 540 includes four influence UI modules 550A-550D. In this embodiment, each influence UI module 550 includes one or more influencer identifiers 555 and an influence input element 560. For example, the one or more influencer identifiers 555 may include a name of the other user, an icon or photograph of the other user, a description of the other user, an association the other user represents, a title of the other user, etc. In some embodiments, one or more of the one or more influencer identifiers 555 may be selected by the user, which causes additional information about the other user to be displayed to the user. In the depicted embodiment, each of the influence input element 560 is a button with a label "+Influence"–however, in other embodiments the influence input elements 560 are other well-known UI elements including text, a graphic, a video, a checkbox, a radio button, etc. After the selection of one or more influence input elements 560, a user influence message is transmitted by the user device (e.g., user device 104A) including identifiers of the selected other users.

In the depicted example, the first influence UI module 550A represents another user of the enterprise system 130 named "Carla Perez." In an embodiment where the enterprise system 130 is a social networking system, this other user may or may not be directly or indirectly connected to the user in the user's social graph. The second influence UI module 550B represents a user named "Jane Holmes" that represents an entity in the enterprise system 130 called "GAMER! INC!". The third influence UI module 550C represents another user named "Hank Rollins" of a musical act named "Hank Rollins Band," and the fourth influence UI module 550D represents an entity named "GAMERZZZ" that is a magazine that may or may not have a representation (i.e., an account or object) within the enterprise system 130. For example, this entity "GAMERZZZ" might be a website provided by an external server 115 that the enterprise system 130 can access (e.g., by crawling the website, by use of an API, etc.) to retrieve rankings of entities.

FIG. 6 illustrates exemplary formulas for use in constructing quality score values according to various embodiments. In some embodiments, one or more of these formulas are utilized with block 320 of FIG. 3 when determining quality score values. In an embodiment, the quality score values are determined by the quality score module 131.

A first formula according to an embodiment of the invention for a size-adjusted quality score value 600 for an entity is presented as QS1, which includes determining an arithmetic mean of user ratings 630 for that entity where "n" is the number of user ratings and "x" is the value of each user rating. The computation of the size-adjusted quality score value 600 further includes modifying the arithmetic mean by a size adjustment value 635. In this depiction, the size adjustment value 635 is a result of taking a logarithm of the number of ratings. The base of the logarithm is represented here with a "b"; in various embodiments of the invention, different values of "b" (e.g., 2, 10, etc.) may be used to implement different adjustments based upon how many total ratings exist for an entity. This depicted size-adjusted quality score value 600 is useful in giving entities with many ratings only slightly more weight than those entities not having many ratings at all, which rewards highly-reviewed entities but still allows unknown entities to "surface" (i.e., become recommended entities) fairly rapidly as they begin getting ratings.

A second formula according to an embodiment of the invention for a spread rating size-adjusted quality score value 605 is presented as QS1A. The spread rating size-adjusted quality score value 605 formula is similar to the size-adjusted quality score value 600 except that it first squares each rating before finding the arithmetic mean 631. This feature of the spread rating size-adjusted quality score value 605 will, in effect, "spread" out the ratings to give much more influence to larger individual ratings. For example, using the size-adjusted quality score value 600 formulation for a first entity with a set of ratings={4; 4; 4; 5} and a second entity with a set of ratings={5; 5; 5; 2} will result in both the first and second entities having a same quality score value. However, using the spread rating size-adjusted quality score value 605 formulation the second entity will have a larger quality score value as each "5" value in its set of ratings is granted additional weight.

A third formula according to an embodiment of the invention for a third-party (3P) influenced size-adjusted quality score value 610 is presented as QS2. In this depicted embodiment, "k" represents the number of third-party ratings to be included as influencing ratings, and "y" represents each of the third-party ratings. The 3P influenced size-adjusted quality score value 610 includes determining a mean of the user ratings 630 as well as utilizing a size adjustment value 635. However, this determined mean 630 is then used as one data point of a set of data points also including each of the third-party ratings, upon which another mean 633 is calculated. Accordingly, each third-party rating is provided equal weight, and each of these third-party ratings is provided the same weight as the "collective" rating value from the mean of all user ratings 630. Of course, in other embodiments each of the third-party ratings "y" may be given more weight, less weight, or different weights than each other or with respect to the collective mean rating value 630.

A fourth formula according to an embodiment of the invention for a freshness-based size-adjusted quality score value 615 is presented as QS3. In this depicted embodiment, the value "AGE" is used to represent an age or amount of time between a current time value (or timestamp) and a previous time value associated the particular rating. For example, the previous time value may be a time the rating was made, a time that the user making the rating is known to have last interacted with the entity (e.g., in an embodiment, this time is a time a last interaction signal message 160 is received (or sent) for that user and entity), or another time value. The amount of time may be in any one of many intervals, where a value of "1" may represent one second, minute, hour, day, week, month, year, or the like, or any fraction of any of these units.

In this depicted embodiment, the freshness-based size-adjusted quality score value 615 includes modifying each rating by the age of the rating, which here includes dividing the rating value by the age value. An arithmetic mean 632 is then calculated using each such adjusted rating value, which is then further adjusted using a size adjustment value 635. This quality score value 615 formulation serves to provide more weight to those ratings from users that are known to most-recently have interacted with the entity. Thus, those users that have most recently interacted with an entity will have their rating of that entity carry more weight.

Of course, these depicted quality score value formulations (600, 605, 610, 615) are not the only possible quality score formulations for use in determining quality score values, and certain features of these quality score formulations may be mixed and matched to arrive at other formulations within the scope of embodiments of the invention. Additionally, other factors associated with the ratings, the users making the ratings, and the entities may also be included in these formations to further affect the quality score value determinations, such as but not limited to the total number of reviews made by a particular user, a number of interaction signal messages received for a particular user-entity combination, a total number of interaction signal messages received for a particular entity across multiple users, a distance of time between a first interaction signal message and a last interaction signal message for a particular user-entity combination, etc.

Figure 7:
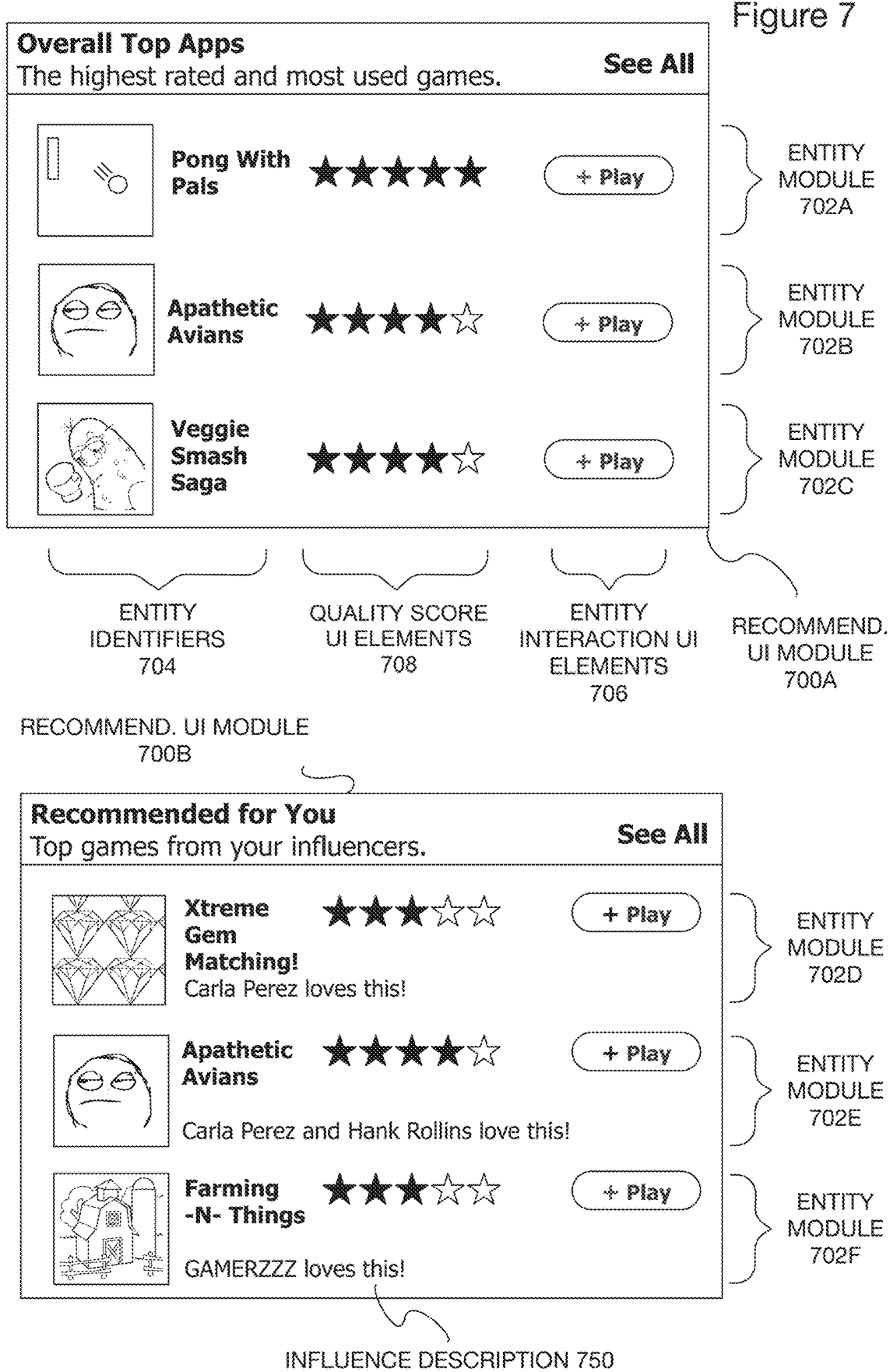
FIG. 7 illustrates exemplary user interfaces including recommendation user interface modules according to one or more embodiments.

FIG. 7 illustrates exemplary recommendation user interface modules 700A-700B including entity modules 702 according to one or more embodiments. In some embodiments of the invention, these recommendation UI modules 700A-700B are used to provide recommendations to users based upon determined quality score values of the entities.

The first recommendation UI module 700A, titled "Overall Top Apps," includes three entity modules 702A-702C recommending three entities: the computer games "Pong With Pals," "Apathetic Avians," and "Veggie Smash Saga." Each of the entity modules 702A-702C includes one or more entity identifiers 704 such as, but not limited to, an icon or image of the entity, a name of the entity, a description of the entity, etc. Each of the depicted entity modules 702A-702C also includes a quality score UI element 708. In an embodiment, the quality score UI elements 708 represent the determined quality score values for each respective entity. The depicted quality score UI elements 708 illustrate a number of stars that the entity received, and may represent partial stars in some embodiments. In embodiments where the quality score values are in a different range of values than the available range of values that can be represented by the quality score UI elements 708, the quality score values may be scaled or otherwise transformed (e.g., rounded) to the same range of values able to be represented by the quality score UI elements 708. In some embodiments, each entity module 702 includes an entity interaction UI element 706 allowing the user the ability to interact with the recommended entity. In the depicted embodiment, each entity interaction UI element 706 is a button with a label "+Play" that, when selected, allows the user to play the respective game. In an embodiment, the first recommended UI module 700A is used with one of quality score value formulations 600, 605, or 615 (or another formulation that is not user-specific).

The second recommendation UI module 700B is titled "Recommended for You" and includes three entity modules 702D-702F. In an embodiment, this second recommendation UI module 700B is utilized along with the quality score value formulation 610 or another formulation that is user-specific. The second recommendation UI module 700B also includes similar modules as the first recommendation UI module 700A, but also includes influence descriptions 750 that describe how one or more of the other users selected as influencers have rated that entity. In another embodiment where the enterprise system 130 is a social networking system, the influence descriptions 750 may describe other users within the user's social graph that have interacted with the entity and/or have rated the entity, wherein these other users may not actually have been selected as "influencers." In some embodiments, the quality score UI elements (e.g., the star ratings) of the recommendation UI module 700B represent the third-party influenced size-adjusted quality score values 610 or another quality score value formulation that is user-specific, but in some embodiments, the quality score UI elements instead represent non-user specific quality score value formulations (e.g., 600, 605, 615) despite the fact that a user-specific quality score value was utilized for the selection of those entities.

Figure 8:
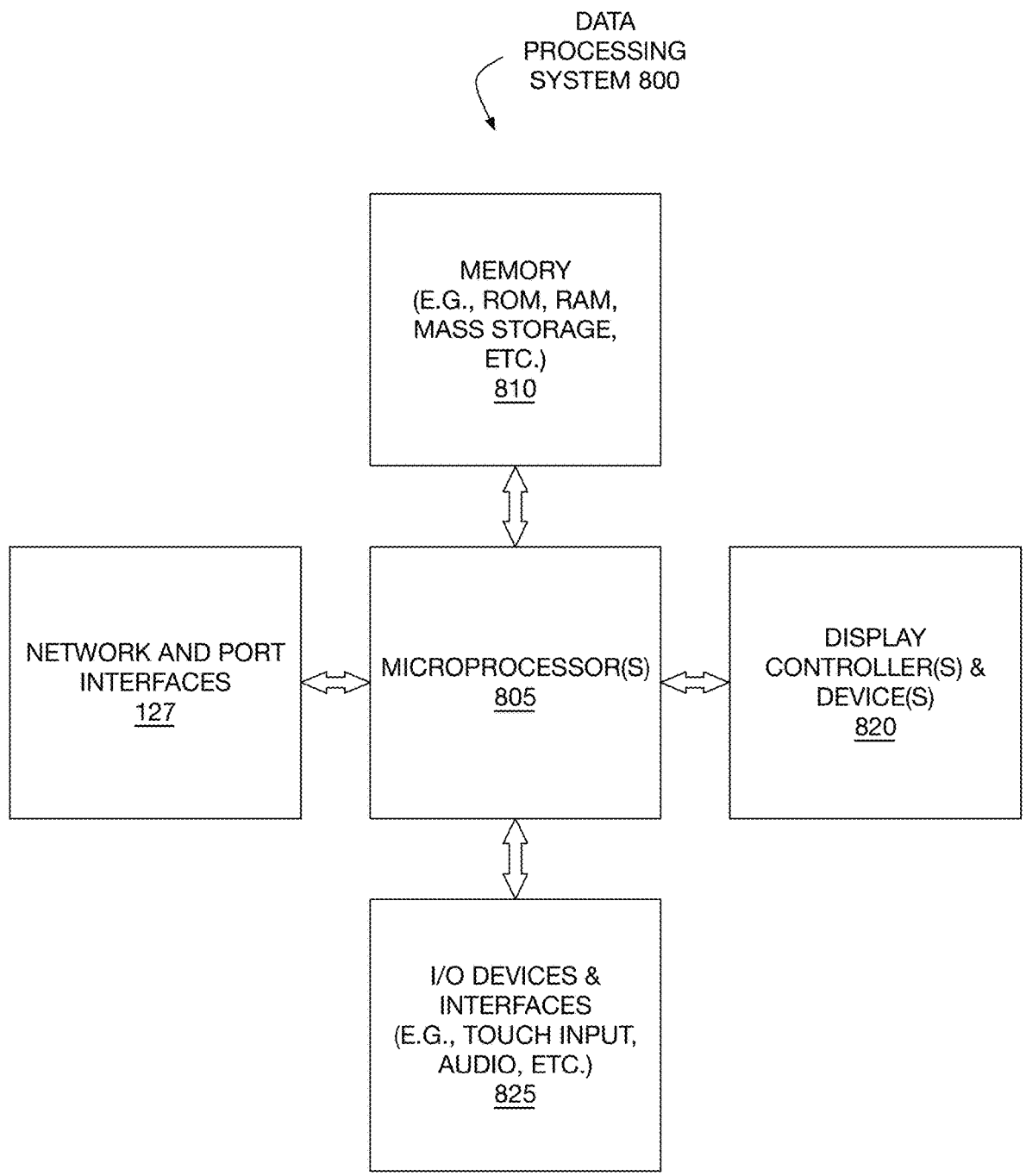
FIG. 8 illustrates, in block diagram form, an exemplary processing system 800 to generate and provide high-quality, low-bias recommendations according an embodiment.

FIG. 8 illustrates, in block diagram form, an exemplary data processing system 800 to generate and provide high-quality, low-bias recommendations according an embodiment. In some embodiments, this is a high-level view of one or more computing devices of the enterprise system 130—which may be a social networking system—as described herein. Data processing system 800 includes one or more microprocessors 805 and connected system components (e.g., multiple connected chips). Alternatively, data processing system 800 is a system on a chip.

Data processing system 800 includes memory 810, which is coupled to microprocessor(s) 805. Memory 810 may be used for storing data, metadata, and programs for execution by the microprocessor(s) 805. For example, memory 810 may include one or more of the data stores 101 and/or may store modules described herein. Memory 810 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 810 may be internal or distributed memory.

Data processing system 800 includes network and port interfaces 127, such as a port, connector for a dock, or a connector for a USB interface, FireWire, Thunderbolt, Ethernet, Fibre Channel, etc. to connect the system 800 with another device, external component, or a network. Exemplary network and port interfaces 127 also include wireless transceivers, such as an IEEE 802.11 transceiver, an infrared transceiver, a Bluetooth transceiver, a wireless cellular telephony transceiver (e.g., 2G, 3G, 4G, etc.), or another transceiver supporting a wireless protocol to connect data processing system 800 with another device, external component, or network and receive stored instructions, data, tokens, etc.

Data processing system 800 also includes display controller and display device 820 and one or more input or output ("I/O") devices and interfaces 825. Display controller and display device 820 provides a visual user interface for the user. I/O devices 825 allow a user to provide input to, receive output from, and otherwise transfer data to and from the system. I/O devices 825 may include a mouse, keypad or a keyboard, a touch panel or a multi-touch input panel, camera, optical scanner, audio input/output (e.g., microphone and/or a speaker), other known I/O devices or a combination of such I/O devices. It will be appreciated that one or more buses may be used to interconnect the various components shown in FIG. 8.

Data processing system 800 may be a personal computer, tablet-style device, a personal digital assistant (PDA), a cellular telephone with PDA-like functionality, a Wi-Fi based telephone, a handheld computer which includes a cellular telephone, a media player system, an entertainment system, or devices that combine aspects or functions of these devices, such as a media player combined with a PDA and a cellular telephone in one device. In other embodiments, data processing system 800 may be a network computer, server end station, or an embedded processing device within another device or consumer electronic product. As used herein, the terms computer, device, system, processing system, processing device, and "apparatus comprising a processing device" may be used interchangeably with data processing system 800 and include the above-listed exemplary embodiments.

Additional components, not shown, may also be part of data processing system 800, and, in certain embodiments, fewer components than those shown in FIG. 8 may also be used in data processing system 800. It will be apparent from this description that aspects of the inventions may be embodied, at least in part, in software. That is, the computer-implemented methods described herein may be carried out in a computer system or other data processing system 800 in response to its processor or processing system 805 executing sequences of instructions contained in a memory, such as memory 810 or other non-transitory machine-readable storage medium. The software may further be transmitted or received over a network (not shown) via network interface device 127. In various embodiments, hardwired circuitry may be used in combination with the software instructions to implement the present embodiments. Thus, the techniques are not limited to any specific combination of hardware circuitry and software, or to any particular source for the instructions executed by data processing system 800.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable storage media suitable for storing electronic instructions. Additionally, embodiments of the invention may be implemented in, but not limited to, hardware or firmware utilizing a Field-Programmable Gate Array (FPGA), Application-specific integrated circuit (ASIC), a processor, a computer, or a computer system including a network. Modules and components of hardware or software implementations can be divided or combined without significantly altering embodiments of the invention.

As detailed herein, some embodiments of a method for providing non-manipulable trusted recommendations include (and some embodiments of a non-transitory machine-readable storage medium store instructions for, and some embodiments of an apparatus are configured for) determining that a plurality of users have interacted with a plurality of entities; causing entity rating user interface modules to be presented to a subset of the plurality of users to allow the subset of users to provide ratings for the plurality of entities, wherein the subset is one or more but fewer than all of the plurality of users and is selected randomly to prevent bias, and wherein the ratings represent opinions of the subset of users about the plurality of entities; receiving, from computing devices of the subset of users, ratings for the plurality of entities; determining quality score values for the plurality of entities based upon the received ratings and timestamps indicating when each respective user last interacted with the respective entity to weight the received ratings accordingly; and causing a recommendation user interface module to be presented to a user, wherein the recommendation user interface module includes a set of one or more entity modules corresponding to a set of one or more of the plurality of entities having the largest or smallest quality score values of the determined quality score values for the plurality of entities.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
    determining that a plurality of user devices associated with a plurality of users have interacted with a plurality of computer applications associated with a plurality of entities;
    randomly selecting a subset of users from the plurality of users that interacted with the plurality of computer applications associated with the plurality of entities;
    providing, to user devices of the randomly selected subset of users, entity rating user interfaces that allow the randomly selected subset of users to provide ratings for the plurality of entities, wherein the ratings represent opinions of the randomly selected subset of users about the plurality of entities;
    accessing ratings for an entity of the plurality of entities received from the user devices of the randomly selected subset of users;
    generating, for each of the accessed ratings for the entity, creation timestamps indicating when the accessed ratings were created;
    determining, for each of the accessed ratings for the entity, an age adjustment distance value that indicates a duration of time between the creation timestamp for the accessed rating and a last interaction timestamp for the accessed rating, wherein the last interaction timestamp indicates when a user that provided each of the accessed ratings last interacted with the entity;
    weighting each of the accessed ratings for the entity by reducing each accessed rating by the corresponding age adjustment distance value that indicates the duration of time between the creation timestamp for the accessed rating and the last interaction timestamp that indicates when a user that provided the accessed rating last interacted with the entity;
    determining, by at least one processor, a quality score value for the entity by combining each of the weighted accessed ratings for the entity; and
    presenting, to a user device associated with a user, a recommendation user interface that comprises a recommendation of the entity based on the entity having an above-average quality score value relative to quality scores other entities of the plurality of entities.

2. The method of claim 1, wherein:
    randomly selecting the subset of users from the plurality of users comprises selecting a predetermined number of users that have interacted with the plurality of computer applications associated with the plurality of entities; and
    the predetermined number of users is based on a total number of users that have interacted with the plurality of computer applications associated with the plurality of entities.

3. The method of claim 1, wherein the quality score value is determined irrespective of when each of the accessed ratings for the entity were created.

4. The method of claim 1, further comprising:
    receiving, from the user device associated with the user, a user influence message identifying one or more other users; and
    adjusting the quality score value for the entity based on one or more ratings received from the one or more other users.

5. The method of claim 1, wherein weighting each of the accessed ratings for the entity adjusts accessed ratings with newer recent timestamp less than accessed ratings with older timestamps.

6. The method of claim 1, wherein accessing the ratings for the entity received from the user devices of the randomly selected subset of users comprises accessing creation timestamps corresponding to the accessed ratings.

7. The method of claim 1, further comprising:
    retrieving a plurality of third party ratings for the plurality of entities from a third party source, wherein the plurality of third party ratings are separate from the accessed ratings for the plurality of entities received from the user devices of the randomly selected subset of users; and
    wherein determining the quality score value for the entity is further based on the plurality of third party ratings retrieved for the entity.

8. The method of claim 1, further comprising filtering the randomly selected subset of users to exclude users that have interacted with the entity fewer than a threshold number of times.

9. A non-transitory computer-readable medium storing instructions which, when executed by one or more processors in a computing device, cause the computing device to:
    determine that a plurality of user devices associated with a plurality of users have interacted with a plurality of computer applications associated with a plurality of entities;
    randomly select a subset of users from the plurality of users that interacted with the plurality of computer applications associated with the plurality of entities;
    provide, to user devices of the randomly selected subset of users, entity rating user interfaces that allow the randomly selected subset of users to provide ratings for the plurality of entities, wherein the ratings represent opinions of the randomly selected subset of users about the plurality of entities;
    access ratings for an entity of the plurality of entities received from the user devices of the randomly selected subset of users;
    generate, for each of the accessed ratings for the entity, creation timestamps indicating when the accessed ratings were created;
    determine, for each of the accessed ratings for the entity, an age adjustment distance value that indicates a duration of time between the creation timestamp for the accessed rating and a last interaction timestamp for the accessed rating, wherein the last interaction timestamp indicates when a user that provided each of the accessed ratings last interacted with the entity;
    weight each of the accessed ratings for the entity by reducing each accessed rating by the corresponding age adjustment distance value that indicates the duration of time between the creation timestamp for the accessed rating and the last interaction timestamp that indicates when a user that provided the accessed rating last interacted with the entity;
    determine a quality score value for the entity by combining each of the weighted accessed ratings for the entity; and
    present, to a user device associated with a user, a recommendation user interface that comprises a recommendation of the entity based on the entity having an above-average quality score value relative to quality scores other entities of the plurality of entities.

10. The non-transitory computer-readable medium of claim 9, wherein:
randomly selecting the subset of users from the plurality of users comprises selecting a predetermined number of users that have interacted with the plurality of computer applications associated with the plurality of entities; and
the predetermined number of users is based on a total number of users that have interacted with the plurality of computer applications associated with the plurality of entities.

11. The non-transitory computer-readable medium of claim 9, wherein the quality score value is determined irrespective of when each of the accessed ratings for the entity were created.

12. The non-transitory computer-readable medium of claim 9, further comprising instructions that, when executed by the one or more processors cause the computing device to:
receive, from the user device associated with the user, a user influence message identifying one or more other users; and
adjust the quality score value for the entity based on one or more ratings received from the one or more other users.

13. The non-transitory computer-readable medium of claim 9, wherein weighting each of the accessed ratings for the entity adjusts accessed ratings with newer recent timestamp less than accessed ratings with older timestamps.

14. The non-transitory computer-readable medium of claim 9, wherein the instructions that, when executed by the one or more processors cause the computing device to access the ratings for the entity received from the user devices of the randomly selected subset of users by accessing creation timestamps corresponding to the accessed ratings.

15. The non-transitory computer-readable medium of claim 9, further comprising instructions that, when executed by the one or more processors, cause the computing device to:
retrieve a plurality of third party ratings for the plurality of entities from a third party source, wherein the plurality of third party ratings are separate from the accessed ratings for the plurality of entities received from the user devices of the randomly selected subset of users; and
wherein determining the quality score value for the entity is further based on the plurality of third party ratings retrieved for the entity.

16. The non-transitory computer-readable medium of claim 9, further comprising instructions that, when executed by the one or more processors, cause the computing device to filter the randomly selected subset of users to exclude users that have interacted with the entity fewer than a threshold number of times.

17. A system comprising:
a processor; and
a non-transitory computer readable storage medium storing instructions which, when executed by the processor, cause the system to:
determine that a plurality of user devices associated with a plurality of users have interacted with a plurality of computer applications associated with a plurality of entities;
randomly select a subset of users from the plurality of users that interacted with the plurality of computer applications associated with the plurality of entities;
provide, to user devices of the randomly selected subset of users, entity rating user interfaces that allow the randomly selected subset of users to provide ratings for the plurality of entities, wherein the ratings represent opinions of the randomly selected subset of users about the plurality of entities;
access ratings for an entity of the plurality of entities received from the user devices of the randomly selected subset of users;
generate, for each of the accessed ratings for the entity, creation timestamps indicating when the accessed ratings were created;
determine, for each of the accessed ratings for the entity, an age adjustment distance value that indicates a duration of time between the creation timestamp for the accessed rating and a last interaction timestamp for the accessed rating, wherein the last interaction timestamp indicates when a user that provided each of the accessed ratings last interacted with the entity;
weight each of the accessed ratings for the entity by reducing each accessed rating by the corresponding age adjustment distance value that indicates the duration of time between the creation timestamp for the accessed rating and the last interaction timestamp that indicates when a user that provided the accessed rating last interacted with the entity;
determine a quality score value for the entity by combining each of the weighted accessed ratings for the entity; and
present, to a user device associated with a user, a recommendation user interface that comprises a recommendation of the entity based on the entity having an above-average quality score value relative to quality scores other entities of the plurality of entities.

18. The system of claim 17, wherein:
randomly selecting the subset of users from the plurality of users comprises selecting a predetermined number of users that have interacted with the plurality of computer applications associated with the plurality of entities; and
the predetermined number of users is based on a total number of users that have interacted with the plurality of computer applications associated with the plurality of entities.

19. The system of claim 17, wherein the quality score value is determined irrespective of when each of the accessed ratings for the entity were created.

20. The system of claim 17, further comprising instructions that, when executed by the processor, cause the system to:
receive, from the user device associated with the user, a user influence message identifying one or more other users; and
adjust the quality score value for the entity based on one or more ratings received from the one or more other users.

21. The system of claim 17, wherein weighting each of the accessed ratings for the entity adjusts accessed ratings with newer recent timestamp less than accessed ratings with older timestamps.

22. The system of claim 17, wherein the instructions that, when executed by the processor, cause the system to access the ratings for the entity received from the user devices of the randomly selected subset of users by accessing creation timestamps corresponding to the accessed ratings.

23. The system of claim 17, wherein the instructions further comprising instructions that, when executed by the processor, cause the system to:
- retrieve a plurality of third party ratings for the plurality of entities from a third party source, wherein the plurality of third party ratings are separate from the accessed ratings for the plurality of entities received from the user devices of the randomly selected subset of users; and
- wherein determining the quality score value for the entity is further based on the plurality of third party ratings retrieved for the entity.

24. The system of claim 17, further comprising instructions that, when executed by the processor, cause the system to filter the randomly selected subset of users to exclude users that have interacted with the entity fewer than a threshold number of times.

* * * * *